Dec. 27, 1966  R. J. FRANZ  3,294,320
BI-METAL TRANSDUCER
Filed April 26, 1965  2 Sheets-Sheet 1
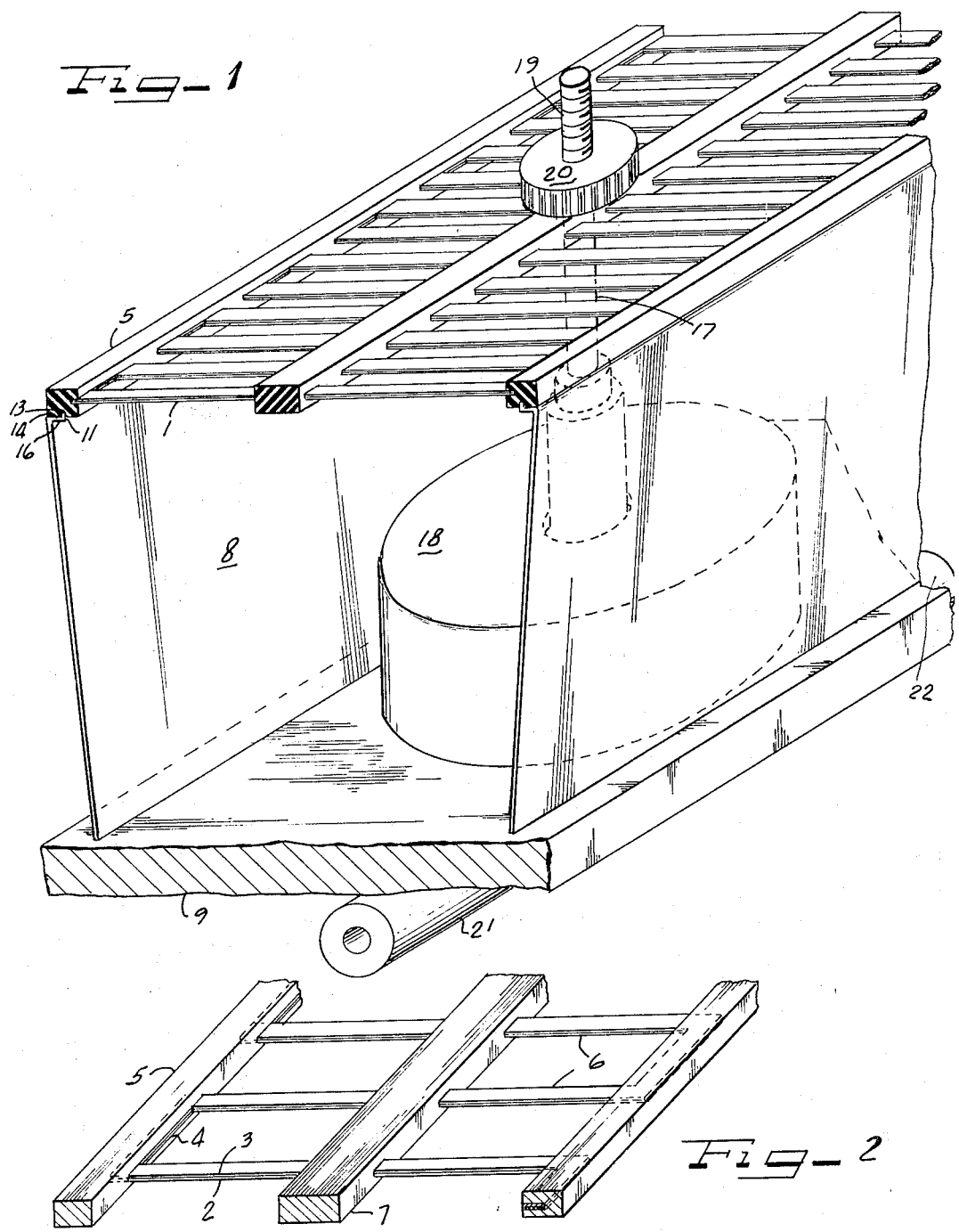
INVENTOR.
RUDOLPH J. FRANZ
BY /s/ ATTORNEYS Dec. 27, 1966  R. J. FRANZ  3,294,320
BI-METAL TRANSDUCER Filed April 26, 1965   2 Sheets-Sheet 2

INVENTOR.
RUDOLPH J. FRANZ

BY *Hill, Sherman, Meroni, Gross & Simpson*
ATTORNEYS

United States Patent Office 3,294,320
Patented Dec. 27, 1966

3,294,320
BI-METAL TRANSDUCER
Rudolph J. Franz, Arlington Heights, Ill., assignor to The Dole Valve Company, Morton Grove, Ill., a corporation of Illinois
Filed Apr. 26, 1965, Ser. No. 450,928
23 Claims. (Cl. 236—87)

This invention relates to a thermo-mehanical transducer and in particular to a transducer using a bi-metal strip having a plurality of legs disposed for developing cumulative force to actuate a mechanical control.

Bi-metal elements have been commonly used to perform certain mechanical functions such as actuating electrical switches or the like. This mechanical function may be accomplished either by ambient thermal activity or by heat generated within the bi-metal material itself due to the presence of an electrical current.

Such a bi-metal element has been recently employed as a control device in the heating system of an automobile, however, in this connection certain difficulties have appeared.

Principal among these obstacles is the fact that it has been found convenient and economical to use the vacuum developed in a combustion type engine as the medium for controlling heat flow to the passenger areas. In contrast, for the typical bi-metal element, the medium to be controlled is a standard source of electrical energy. The critical difference between the functions performed by the bi-metal elements in these two instances lies in the amount of force required to control the different media. For example, to control the amount of vacuum delivered from one point to another, means must be provided for interrupting a flow of air in the connecting conduit. It can be imagined then, that this means requires considerably more mechanical effort than the force needed to simply open and close an electrical contact. By itself, therefore, the typical bi-metal element is inadequate in this system.

Various approaches to this problem have been suggested. For instance, if the bi-metal element is to be actuated by the ambient temperature, the slight amount of force expected from such an element could be used to operate an electrical motor which, in turn would control the flow of air and hence the degree of vacuum delivered to the system.

In the alternative, if the bi-metal activity is accomplished by the presence of an electrical current, then this current could be increased to a high level for super-heating the bi-metal element and thereby generating the needed force for directly controlling the air flow.

It has been learned, however, that both these approaches have the unfortunate drawback of introducing additional costly components into the control system. In the first case, an additional motor and its back-up equipment is required. In the second example, an amplifier stage would be necessary as the voltage levels available in an automobile electrical circuit are limited.

Therefore, it is an object of this invention to provide a bi-metal control for developing directly a high degree of mechanical force in response to relatively minute thermal changes.

It is another object of this invention to provide a bi-metal transducer for conveniently and economically controlling the flow of air through a conduit.

It is a further object of this invention to provide a bi-metal transducer adaptable to the needs of an automobile heating system to regulate the degree of vacuum delivered from the engine for controlling the heat flow to the interior of the vehicle.

These and other objects, features and advantages of the present invention will be understood in greater detail from the following description and the associated drawings wherein reference numerals are utilized in designating a preferred embodiment and wherein:

FIGURE 1 is an isometric view showing the external elements including the bi-metal strip of the transducer meeting the specifications of this invention;

FIGURE 2 is a top view of the bi-metal element and its supporting frame as employed in the transducer of FIGURE 1.

Figure 3:
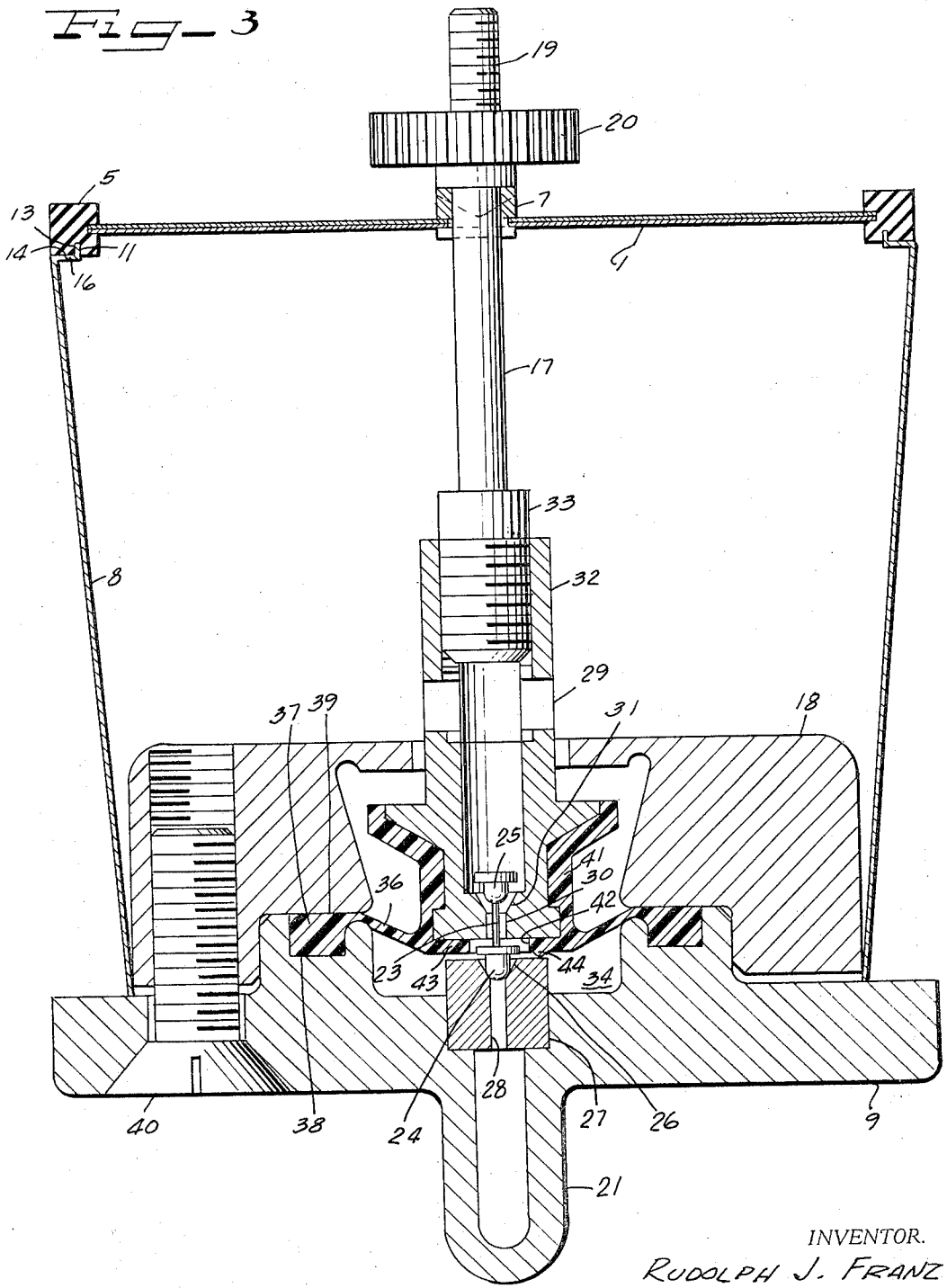
FIGURE 3 is a cross-sectional view of the diagram of FIGURE 1 taken along the lines I—I and showing pertinent internal parts of the assembled transducer components.

A preferred embodiment of the bi-metal transducer of the present invention is shown in FIGURE 1 as having a bi-metal element disposed horizontally for actuating a vertical shaft to perform the desired control function. As has been mentioned above, conventional bi-metal elements are not adapted to this type of task as the maximum actuating force developed tends to be insufficient. To maintain the advantages long associated with the bi-metal element as a temperature sensing device, and, at the same time, to overcome its structural deficiencies a novel configuration has been employed in this invention.

This novel configuration may be seen in its assembled form in FIGURE 1 and is designated generally by the reference numeral 1. However, a more detailed study of this thermal element can be achieved by reference to FIGURE 2 which shows a perspective view of that unit apart from its working environment.

Referring to FIGURE 2, therefore, it can be observed that the strip itself comprises two layers of metal 2 and 3 having contrasting expansion coefficients. The separate layers are bonded together, shaped to form a repetitive rectangular wave, and suitably secured in slots 4 cut longitudinally within the outermost arms 5.

There are two principal aspects of this bi-metal element that are basic to the operation of this invention. First, this strip forms a continuous conduction path permitting it to be heated by a flow of current as determined by external circuitry. For example, a thermistor and a power source may be serially connected with the bi-metal strip to form a completed circuit. In this way, the thermal characteristics of the bi-metal element can be invoked by the temperature of the environment associated with the thermistor which may be far removed from the physical location of the bi-metal element, itself.

The second important feature relative to the operation of this device is the provision for a large number of parallel legs designated by the numeral 6. When the bi-metal element deflects, due to either electrical or ambient heat, all the parallel legs 6 will deflect in a similar pattern. Then, by using an interconnecting member 7, the individual forces due to the deflection of the separate legs can be accumulated, resulting in a net force on the member 7 equal to the deflection force of one leg times the number of parallel legs present.

A better understanding of the control function performed by the bi-metal element can be acquired by a review of the working relationship of the components shown in FIGURE 1. In FIGURE 1, the bi-metal strip is shown mounted on a supporting frame and orientated for actuating a control valve disposed centrally thereof. The supporting frame has flexible side walls 8 suitably affixed to the base 9 of the transducer body. The side walls 8 are bent to form a right angle at the upper portion terminating in a vertical lip 11 for receiving the outermost arms 5 of the bi-metal rack. For this purpose, the arms 5 are provided with a longitudinal notch 13 disposed inwardly thereof to make room for additional supporting surfaces in the form of faces 14 and 16 of the cooperating members.

The purpose of employing flexible side walls becomes apparent from observing the motions to be expected from a deflection of the bi-metal element. For example, with the bi-metal element deflected upwardly for actuating the control valve, the effective horizontal span of the legs 6 would tend to be correspondingly shortened. By providing flexible side walls, then the outermost arms 5 are allowed to move inwardly (or outwardly) without frictional losses thereby bolstering the principal objective of this invention which is to maximize the power available at the bi-metal element.

In further considering FIGURE 1, it is understood that the interconnecting member 7 is the power member of the system. Therefore, it is this member that is employed to directly drive a valve pin 17 for actuating the control valve (to be described below) located within the transducer housing 18. To manually calibrate this control valve the pin 17 is provided with a threaded stem 19 and a calibration nut 20. By adjusting the nut 20 the valve pin 17 can be raised or lowered to a desirable setting corresponding to a chosen temperature level. Subsequent changes in temperature within the bi-metal strip will then alter the position of the pin 17 about this nominal setting for opening and closing the control valve and regulating the vacuum delivered from the inlet 21 to the outlet 22.

The detailed features of the control valve itself are shown in the cross-sectional view provided in FIGURE 3.

This valve performs two important functions. First, it provides a means for opening and closing a vacuum input. Second, it provides a means for venting the vacuum which would be otherwise trapped at the output, after the input is closed. Were it not for this second provision, no control function could be achieved as the output would be held in an invariable vacuum state.

In FIGURE 3 it can be seen that both these means are provided in a single valve member 23 having lower and upper valve heads 24 and 25 respectively. The lower head 24 is used to open and close the vacuum inlet 21 and in particular, is cooperable with a valve seat 26 formed within a plug 27. The plug 27 then has a passageway 28 communicable with the inlet 21.

The upper valve head 25 is used to vent the outlet 22 after the closing of the vacuum supply at the inlet 21. Here, the head 25 is cooperable with a valve seat 31 formed at the interior of a sleeve 32 which is connected by a threaded plug 33 to be directly driven by the pin 17 of the bi-metal element 1. The venting from the head 25 takes place through ports 29 leading from the interior of the sleeve 32.

Several other components cooperate with the upper head 25 to make the required venting possible. First, a chamber 34 is directly communicable with the outlet 22, therefore, outlet pressure and chamber pressure will be identical at all times. Second, a diaphragm 36 which defines the upper wall of the chamber 34 is designed to assure a passageway to the interior of the sleeve 32 when the head 25 is removed from the seat 31. Third, the heads 24 and 25 are sufficiently separated on the valve member 23 to allow the head 25 to be lifted off the seat 31 when the sleeve 32 is fully lowered. Fourth, the valve guide port 30 has a diameter adequately larger than the valve member 23 to permit the passage of a sufficient air flow for venting purposes. The cooperation of these features will be made more apparent from the following detailed description of the individual components.

Principal among these components is the diaphragm 36 which, as shown in FIGURE 3, has an outer lip 37 snapped into a complementary groove 38 and secured by a collar 39 of the housing 18. The housing 18 is, in turn, mounted to the base 9 by a plurality of screws 40. The inner portion of the diaphragm 36 takes the form of a cylindrical tubing 41 complementarily formed to maintain a snap pressure fit about the base of the vertical sleeve 32.

To provide for the venting of the chamber 34, the diaphragm 36 has a port 42 formed within a flange 43 extending inwardly at the lower surface of the sleeve 32. Also, this flange 43 has a partially raised ridge 44 to hold the lower surface of the sleeve 32 removed from the upper surface of plug 27. In this way a continuous path is provided from the chamber 34 to the port 29.

In operation, the valve position shown in the diagram corresponds to a venting state. The vacuum inlet 21 is closed by the head 42, and the outlet chamber 34 is directly communicable with the atmosphere through the ports 29 and 30.

However, when the bi-metal element is heated, indicating that the controlled environment is being satisfied, it will deflect upwardly carrying the pin 17 and the sleeve 32. At a point in its upward movement determined by the chosen position of the calibration nut 20, the seat 31 will contact the head 25 closing the port 30. At this point the outlet 20 is no longer communicable with the atmosphere.

As the sleeve 32 continues to raise, the head 24 will be lifted off the seat 26 exposing the vacuum source directly to the chamber 34 and hence to the outlet 22 where it may be utilized to perform the desired control function, which in this case is the terminating of the heat flow to the controlled environment.

It will be understood that various modifications may be suggested by the embodiment disclosed, but I desire to claim within the scope of the patent warranted hereon all such modifications as come within the scope of my invention.

I claim as my invention:

1. A temperature responsive actuator comprising a continuous bi-metal strip having the junction line of its two metals lying generally in a plane and having a plurality of bights and substantially transverse segments interconnecting said bights to form a repetitive wave, a supporting frame having a pair of spaced arms, one of said arms being substantially rigidly secured to one alternate set of bights of said bi-metal strip, the other of said arms being substantially rigidly secured to the other set of bights of said bi-metal strip, an actuating arm secured to said bi-metal strip at a plurality of points located intermediate said pair of supporting arms, said actuating arm being movable by said bi-metal strip upon a temperature change of said bi-metal strip.

2. A temperature responsive actuator comprising a continuous bi-metal strip having the junction line of its two metals lying generally in a plane and having a plurality of bights and a plurality of interconnecting segments, which together with the bights form a repetitive wave, a supporting frame having a pair of spaced arms, one of said arms being substantially rigidly secured to one alternate set of bights of said bi-metal strip, the other of said arms being substantially rigidly secured to the other set of bights of said bi-metal strip, means for connecting said bi-metal strip to an external electrical circuit, an actuating arm secured to said bi-metal strip at a plurality of points located intermediate said pair of supporting arms, said actuating arm being movable by said bi-metal strip upon a temperature change of said bi-metal strip.

3. A temperature responsive actuator comprising a continuous bi-metal strip having the junction line of its two metals lying generally in a plane and having a plurality of bights and interconnecting segments forming a continuous wave-like element, a supporting frame having a pair of spaced arms, one of said arms being substantially rigidly secured to one alternate set of bights of said bi-metal strip, the other of said arms being substantially rigidly secured to the other set of bights of said bi-metal strip, an actuating arm secured to said bi-metal strip at a plurality of points located intermediate said pair of supporting arms, said actuating arm being movable by said bi-metal strip upon a temperature change of said bi-metal strip, a vacuum regulator, said vacuum regulator being operated by said actuating arm for determining the degree of vacuum delivered to a vacuum responsive mechanism.

4. A temperature responsive actuator comprising a continuous bi-metal strip having the junction line of its two metals lying generally in a plane and having a plurality of bights and interconnecting segments forming a continuous wave-like element, a supporting frame having a pair of spaced arms, one of said arms being substantially rigidly secured to one alternate set of bights of said bi-metal strip, the other of said arms being substantially rigidly secured to the other set of bights of said bi-metal strip, an actuating arm secured to said bi-metal strip at a plurality of points located intermediate said pair of supporting arms, said actuating arm being movable by said bi-metal strip upon a temperature change of said bi-metal strip, a vacuum regulator, said vacuum regulator including a regulator body having an inlet connected to a vacuum source and an outlet connected to a vacuum responsive mechanism for regulating heat flow to a controlled environment, a control chamber formed within said regulator body and being connected directly to said inlet and outlet, a valve means disposed at said inlet for regulating the vacuum reaching said control chamber, said valve means being connected to be operated by said actuating arm of said bi-metal strip.

5. A temperature responsive actuator comprising a continuous bi-metal strip having the junction line of its two metals lying generally in a plane and having a plurality of bights and a plurality of substantially parallel segments forming a continuous wave-like element, a supporting frame having a pair of spaced arms, one of said arms being substantially rigidly secured to one alternate set of bights of said bi-metal strip, the other of said arms being substantially rigidly secured to the other set of bights of said bi-metal strip, an actuating arm secured to said bi-metal strip at a plurality of points located intermediate said pair of supporting arms, said actuating arm being movable by said bi-metal strip upon a temperature change of said bi-metal strip, a vacuum regulator, said vacuum regulator including a regulator body having an inlet connected to a vacuum source and an outlet connected to a vacuum responsive mechanism for regulating heat flow to a controlled environment, a control chamber and a vent chamber formed within said regulator body, said control chamber being connected directly to said inlet and outlet and said vent chamber being connected directly to said control chamber and to the atmosphere, a valve member having a first valve head cooperable with said inlet for controlling the vacuum reaching said control chamber and a second valve head disposed intermediate said control chamber and said vent chamber for controlling the flow of air therebetween, said valve member being connected to be operated by said actuating arm of said bi-metal strip.

6. A temperature responsive actuator comprising a continuous bi-metal strip having the junction line of its two metals lying generally in a plane and having a plurality of bights and a plurality of interconnecting segments forming a continuous wave-like element, a supporting frame having a pair of spaced arms, one of said arms being substantially rigidly secured to one alternate set of bights of said bi-metal strip, the other of said arms being substantially rigidly secured to the other set of bights of said bi-metal strip, an actuating arm secured to said bi-metal strip at a plurality of points located intermediate said pair of supporting arms, said actuating arm being movable by said bi-metal strip upon a temperature change of said bi-metal strip, a vacuum regulator, said vacuum regulator including a regulator body having an inlet connected to a vacuum source and an outlet connected to a vacuum responsive mechanism for regulating heat flow to a controlled environment, a control chamber formed within said regulator body and being connected directly to said inlet, a resilient diaphragm forming a wall of said control chamber and having a port conducting from said control chamber to the atmosphere, a valve member having a first valve head cooperable with said inlet for controlling the vacuum reaching said control chamber and a second valve head cooperable with said port for controlling the flow of air between said control chamber and the atmosphere, said valve member being connected to be operated by said actuating arm of said bi-metal strip.

7. A temperature responsive actuator comprising a continuous bi-metal strip having the junction line of its two metals lying generally in a plane and having a plurality of bights and interconnecting segments forming a continuous wave-like element, a supporting frame having a pair of spaced arms, one of said arms being substantially rigidly secured to one alternate set of bights of said bi-metal strip, the other of said arms being substantially rigidly secured to the other set of bights of said bi-metal strip, an actuating arm secured to said bi-metal strip at a plurality of points located intermediate said pair of supporting arms, said actuating arm being movable by said bi-metal strip upon a temperature change of said bi-metal strip, a vacuum regulator, said vacuum regulator including a regulator body having an inlet connected to a vacuum source and an outlet connected to a vacuum responsive mechanism for regulating heat flow to a controlled environment, a control chamber formed within said regulator body and being connected directly to said inlet, a resilient diaphragm forming a wall of said control chamber and having a port conducting from said control chamber to the atmosphere, a valve member having a first valve head cooperable with said inlet for controlling the vacuum reaching said control chamber and a second valve head cooperable with said port for controlling the flow of air between said control chamber and the atmosphere, said actuating arm of said bi-metal strip being connected to said valve member for opening said inlet and substantially simultaneously closing said port, whereby said vacuum source is provided with a pressure sealed connection to said vacuum responsive mechanism.

8. A temperature responsive actuator comprising a continuous bi-metal strip having the junction line of its two metals lying generally in a plane and having a plurality of bights and interconnecting segments in the form of a repetitive wave, a supporting frame having a pair of spaced arms, one of said arms being substantially rigidly secured to one alternate set of bights of said bi-metal strip, the other of said arms being substantially rigidly secured to the other set of bights of said bi-metal strip, an actuating arm secured to said bi-metal strip at a plurality of points located intermediate said pair of supporting arms, said actuating arm being movable by said bi-metal strip upon a temperature change of said bi-metal strip, a vacuum regulator, said vacuum regulator including a regulator body having an inlet connected to a vacuum source and an outlet connected to a vacuum responsive mechanism for regulating heat flow to a controlled environment, a control chamber formed within said regulator body and being connected directly to said inlet, a resilient diaphragm forming a wall of said control chamber and having a port conducting from said control chamber to the atmosphere, a valve member having a first valve head cooperable with said inlet for controlling the vacuum reaching said control chamber and a second valve head cooperable with said port for controlling the flow of air between said control chamber and the atmosphere, said actuating arm of said bi-metal strip being connected to said valve member for closing said inlet and substantially simultaneously opening said port, whereby said control chamber is vented to the atmosphere upon the closing of said vacuum source at said inlet.

9. A temperature responsive actuator comprising a continuous bi-metal strip having the junction line of its two metals lying generally in a plane and having a plurality of bights and interconnecting segments in the form of a repetitive wave, a supporting frame having a pair of spaced arms, one of said arms being substantially rigidly secured to one alternate set of bights of said bi-metal strip, the other of said arms being substantially rigidly secured to the other set of bights of said bi-metal strip, an actuating arm secured to said bi-metal strip at a plurality of points located intermediate said pair of supporting arms, said actuating arm being movable by said bi-metal strip upon a temperature change of said bi-metal strip, a vacuum regulator, said vacuum regulator including a regulator body having an inlet connected to a vacuum source and an outlet connected to a vacuum responsive mechanism for regulating heat flow to a controlled environment, a control chamber formed within said regulator body and being connected directly to said inlet, said actuating arm of said bi-metal strip having a sleeve extending to said control chamber, said sleeve having an inwardly extending flange and a first port formed therein leading from the interior of said sleeve to said control chamber, said sleeve having a second port leading from the interior of said sleeve to the atmosphere, a resilient diaphragm forming a wall of said control chamber and providing a pressure seal intermediate said sleeve and said regulator body, a valve member having a first valve head cooperable with said inlet for controlling the vacuum reaching said control chamber and a second valve head disposed interior to said sleeve for being carried by said inwardly extending flange and for being cooperable with said first port for controlling the flow of air from said control chamber to the interior of said sleeve, whereby raising said sleeve due to thermal changes in said bi-metal strip will close said first port and substantially simultaneously open said inlet to form a pressure connection between said vacuum source and said vacuum responsive mechanism.

10. A temperature responsive actuator comprising a continuous bi-metal strip having the junction line of its two metals lying generally in a plane and having a plurality of bights and interconnecting segments forming a wave-shape element, a supporting frame having a pair of spaced arms, one of said arms being substantially rigidly secured to one alternate set of bights of said bi-metal strip, the other of said arms being substantially rigidly secured to the other set of bights of said bi-metal strip, an actuating arm secured to said bi-metal strip at a plurality of points located intermediate said pair of supporting arms, said actuating arm being movable by said bi-metal strip upon a temperature change of said bi-metal strip, a vacuum regulator, said vacuum regulator including a regulator body having an inlet connected to a vacuum source and an outlet connected to a vacuum responsive mechanism for regulating heat flow to a controlled environment, a control chamber formed within said regulator body and being connected directly to said inlet, said actuating arm of said bi-metal strip having a sleeve extending to said control chamber, said sleeve having an inwardly extending flange and a first port formed therein leading from the interior of said sleeve to having an inwardly extending flange and a first port leading from the interior of said sleeve to the atmosphere, a resilient diaphragm forming a wall of said control chamber and providing a pressure seal intermediate said sleeve and said regulator body, said resilient diaphragm having a portion thereof extending intermediate said inlet and said inwardly extending flange and having a raised section thereof holding said flange in spaced relation with said inlet for forming a path from said control chamber to the interior of said sleeve, a valve member having a first valve head cooperable with said inlet for controlling the vacuum reaching said control chamber and a second valve head disposed interior to said sleeve for being carried by said inwardly extending flange and for being cooperable with said first port for controlling the flow of air from said control chamber to the atmosphere, whereby raising said sleeve due to thermal changes in said bi-metal strip will close said first port and substantially simultaneously open said inlet to form a pressure connection between said vacuum source and said vacuum responsive mechanism.

11. A temperature responsive actuator comprising a bi-metal ribbon flatly disposed to have a repetitive wave shape including a plurality of bights in oppositely orientated sets, a supporting frame having a pair of parallel spaced arms, one of said arms being substantially rigidly secured to one alternate set of bights of said bi-metal ribbon, the other of said arms being substantially rigidly secured to the other set of bights of said bi-metal ribbon, an actuating arm disposed substantially intermediate and parallel to said pair of supporting arms and secured to said bi-metal ribbon at each point of intersection therewith, said actuating arm being movable by said bi-metal ribbon upon a temperature change therein.

12. A temperature responsive actuator comprising a bi-metal ribbon flatly disposed to have a repetitive wave shape including a plurality of bights in oppositely orientated sets, a supporting frame having a pair of parallel spaced arms, one of said arms being substantially rigidly secured to one alternate set of bights of said bi-metal ribbon, the other of said arms being substantially rigidly secured to the other set of bights of said bi-metal ribbon, an actuating arm disposed substantially intermediate and parallel to said pair of supporting arms and secured to said bi-metal ribbon at each point of intersection therewith, said actuating arm being movable by said bi-metal ribbon upon a temperature change therein, a vacuum regulator, said vacuum regulator being operated by said actuating arm for determining the degree of vacuum delivered to a vacuum responsive mechanism.

13. A temperature responsive actuator comprising a bi-metal ribbon flatly disposed to have a repetitive wave shape including a plurality of bights in oppositely orientated sets, a supporting frame having a pair of parallel spaced arms, one of said arms being substantially rigidly secured to one alternate set of bights of said bi-metal ribbon, the other of said arms being substantially rigidly secured to the other set of bights of said bi-metal ribbon, an actuating arm disposed substantially intermediate and parallel to said pair of supporting arms and secured to said bi-metal ribbon at each point of intersection therewith, said actuating arm being movable by said bi-metal ribbon upon a temperature change therein, a vacuum regulator, said vacuum regulator including a regulator body having an inlet connected to a vacuum source and an outlet connected to a vacuum responsive mechanism for regulating heat flow to a controlled environment, a control chamber formed within said regulator body and being connected directly to said inlet and outlet, a valve means disposed at said inlet for regulating the vacuum reaching said control chamber, said chamber means being connected to be operated by said actuating arm of said bi-metal strip.

14. A temperature responsive actuator comprising a bi-metal ribbon flatly disposed to have a repetitive wave shape including a plurality of bights in oppositely orientated sets, a supporting frame having a pair of parallel spaced arms, one of said arms being substantially rigidly secured to one alternate set of bights of said bi-metal ribbon, the other of said arms being substantially rigidly secured to the other set of bights of said bi-metal ribbon, an actuating arm disposed substantially intermediate and parallel to said pair of supporting arms and secured to said bi-metal ribbon at each point of intersection therewith, said actuating arm being movable by said bi-metal ribbon upon a temperature change therein, a vacuum regulator, said vacuum regulator including a regulator body having an inlet connected to a vacuum source and an outlet connected to a vacuum responsive mechanism for regulating heat flow to a controlled environment, a control chamber and a vent chamber formed within said regulator body, said control chamber being connected directly to said inlet and outlet and said vent chamber being connected directly to said control chamber and to the atmosphere, a valve member having a first valve head cooperable with said inlet for controlling the vacuum reaching said control chamber and a second valve head disposed intermediate said control chamber and said vent chamber for controlling the flow of air therebetween, said valve member being connected to be operated by said actuating arm of said bi-metal strip.

15. A temperature responsive actuator comprising a bi-metal ribbon flatly disposed to have a repetitive wave shape including a plurality of bights in oppositely orientated sets, a supporting frame having a pair of parallel spaced arms, one of said arms being substantially rigidly secured to one alternate set of bights of said bi-metal ribbon, the other of said arms being substantially rigidly secured to the other set of bights of said bi-metal ribbon, an actuating arm disposed substantially intermediate and parallel to said pair of supporting arms and secured to said bi-metal ribbon at each point of intersection therewith, said actuating arm being movable by said bi-metal ribbon upon a temperature change therein, a vacuum regulator, said vacuum regulator including a regulator body having an inlet connected to a vacuum source and an outlet connected to a vacuum responsive mechanism for regulating heat flow to a controlled environment, a control chamber formed within said regulator body and being connected directly to said inlet, a resilient diaphragm forming a wall of said control chamber and having a port conducting from said control chamber to the atmosphere, a valve member having a first valve head cooperable with said inlet for controlling the vacuum reaching said control chamber and a second valve head cooperable with said port for controlling the flow of air between said control chamber and the atmosphere, said valve member being connected to be operated by said actuating arm of said bi-metal strip.

16. A temperature responsive actuator comprising a bi-metal ribbon flatly disposed to have a repetitive wave shape including a plurality of bights in oppositely orientated sets, a supporting frame having a pair of parallel spaced arms, one of said arms being substantially rigidly secured to one alternate set of bights of said bi-metal ribbon, the other of said arms being substantially rigidly secured to the other set of bights of said bi-metal ribbon, an actuating arm disposed substantially intermediate and parallel to said pair of supporting arms and secured to said bi-metal ribbon at each point of intersection therewith, said actuating arm being movable by said bi-metal ribbon upon a temperature change therein, a vacuum regulator, said vacuum regulator including a regulator body having an inlet connected to a vacuum source and an outlet connected to a vacuum responsive mechanism for regulating heat flow to a controlled environment, a control chamber formed within said regulator body and being connected directly to said inlet, a resilient diaphragm forming a wall of said control chamber and having a port conducting from said control chamber to the atmosphere, a valve member having a first valve head cooperable with said inlet for controlling the vaccum reaching said control chamber and a second valve head cooperable with said port for controlling the flow of air between said control chamber and the atmosphere, said actuating arm of said bi-metal strip being connected to said valve member for opening said inlet and substantially simultaneously closing said port whereby said vacuum source is provided with a pressure sealed connection to said vacuum responsive mechanism.

17. A temperature responsive actuator comprising a bi-metal ribbon flatly disposed to have a repetitive wave shape including a plurality of bights in oppositely orientated sets, a supporting frame having a pair of parallel spaced arms, one of said arms being substantially rigidly secured to one alternate set of bights of said bi-metal ribbon, the other of said arms being substantially rigidly secured to the other set of bights of said bi-metal ribbon, an actuating arm disposed substantially intermediate and parallel to said pair of supporting arms and secured to said bi-metal ribbon at each point of intersection therewith, said actuating arm being movable by said bi-metal ribbon upon a temperature change therein, a vacuum regulator, said vacuum regulator including a regulator body having an inlet connected to a vacuum source and an outlet connected to a vacuum responsive mechanism for regulating heat flow to a controlled environment, a control chamber formed within said regulator body and being connected directly to said inlet, a resilient diaphragm forming a wall of said control chamber and having a port conducting from said control chamber to the atmosphere, a valve member having a first valve head cooperable with said inlet for controlling the vacuum reaching said control chamber and a second valve head cooperable with said port for controlling the flow of air between said control chamber and the atmosphere, said actuating arm of said bi-metal strip being connected to said valve member for closing said inlet and substantially simultaneously opening said port, whereby said control chamber is vented to the atmosphere upon the closing of said vacuum source at said inlet.

18. A temperature responsive actuator comprising a continuous bi-metal strip having the junction line of its two metals lying generally in a plane and having a plurality of bights and substantially parallel segments, a supporting frame having a pair of spaced arms, one of said arms being substantially rigidly secured to one alternate set of bights of said bi-metal strip, the other of said arms being substantially rigidly secured to the other set of bights of said bi-metal strip, an actuator housing including a base having side walls attached thereto, said side walls providing the principal support to said spaced arms and being comprised of a highly flexible material for allowing freedom of movement of said bi-metal strip due to temperature changes therein, an actuating arm secured to said bi-metal strip at a plurality of points located intermediate said pair of supporting arms, said actuating arm being movable by said bi-metal strip upon a temperature change of said bi-metal strip.

19. A temperature responsive actuator comprising a continuous bi-metal strip having the junction line of its two metals lying generally in a plane and having a plurality of bights and interconnecting segments forming a wave-shape element, a supporting frame having a pair of spaced arms, one of said arms being substantially rigidly secured to one alternate set of bights of said bi-metal strip, the other of said arms being substantially rigidly secured to the other set of bights of said bi-metal strip, an actuator housing including a base having side walls attached thereto, said side walls providing the principal support to said spaced arms and being comprised of a highly flexible material for allowing freedom of movement of said bi-metal strip due to temperature changes therein, an actuating arm secured to said bi-metal strip at a plurality of points located intermediate said pair of supporting arms, said actuating arm being movable by said bi-metal strip upon a temperature change of said bi-metal strip, a vacuum regulator, said vacuum regulator being operated by said actuating arm for determining the degree of vacuum delivered to a vacuum responsive mechanism.

20. A temperature responsive actuator comprising a continuous bi-metal strip having the junction line of its two metals lying generally in a plane and having a plurality of bights and interconnecting segments forming a wave-shape element, a supporting frame having a pair of spaced arms, one of said arms being substantially rigidly secured to one alternate set of bights of said bi-metal strip, the other of said arms being substantially rigidly secured to the other set of bights of said bi-metal strip, an actuator housing including a base having side walls attached thereto, said side walls providing the principal support to said spaced arms and being comprised of a highly flexible material for allowing freedom of movement of said bi-metal strip due to temperature changes therein, an actuating arm secured to said bi-metal strip at a plurality of points located intermediate said pair of supporting arms, said actuating arm being movable by said bi-metal strip upon a temperature change of said bi-metal strip, a vacuum regulator, said vacuum regulator including a regulator body having an inlet connected to a vacuum source and an outlet connected to a vacuum responsive mechanism for regulating heat flow to a controlled environment, a control chamber formed within said regulator body and being connected directly to said inlet and outlet, a valve means disposed at said inlet for regulating the vacuum reaching said control chamber, said valve means being connected to be operated by said actuating arm of said bi-metal strip.

21. A temperature responsive actuator comprising a continuous bi-metal strip having the junction line of its two metals lying generally in a plane and having a plurality of bights and a plurality of transversely connecting segments, a supporting frame having a pair of spaced arms, one of said arms being substantially rigidly secured to one alternate set of bights of said bi-metal strip, the other of said arms being substantially rigidly secured to the other set of bights of said bi-metal strip, an actuator housing including a base having side walls attached thereto, said side walls providing the principal support to said spaced arms and being comprised of a highly flexible material for allowing freedom of movement of said bi-metal strip due to temperature changes therein, an actuating arm secured to said bi-metal strip at a plurality of points located intermediate said pair of supporting arms, said actuating arm being movable by said bi-metal strip upon a temperature change of said bi-metal strip, a vacuum regulator, said vacuum regulator including a regulator body having an inlet connected to a vacuum source and an outlet connected to a vacuum responsive mechanism for regulating heat flow to a controlled environment, a control chamber and a vent chamber formed within said regulator body, said control chamber being connected directly to said inlet and outlet and said vent chamber being connected directly to said control chamber and to the atmosphere, a valve member having a first valve head cooperable with said inlet for controlling the vacuum reaching said control chamber and a second valve head disposed intermediate said control chamber and said vent chamber for controlling the flow of air therebetween, said valve member being connected to be operated by said actuating arm of said bi-metal strip.

22. A temperature responsive actuator comprising a continuous bi-metal strip having the junction line of its two metals lying generally in a plane and having a plurality of bights and a plurality of substantially parallel segments, a supporting frame having a pair of spaced arms, one of said arms being substantially rigidly secured to one alternate set of bights of said bi-metal strip, the other of said arms being substantially rigidly secured to the other set of bights of said bi-metal strip, an actuator housing including a base having side walls attached thereto, said side walls providing the principal support to said spaced arms and being comprised of a highly flexible material for allowing freedom of movement of said bi-metal strip due to temperature changes therein, an actuating arm secured to said bi-metal strip at a plurality of points located intermediate said pair of supporting arms, said actuating arm being movable by said bi-metal strip upon a temperature change of said bi-metal strip, a vacuum regulator, said vacuum regulator including a regulator body having an inlet connected to a vacuum source and an outlet connected to a vacuum responsive mechanism for regulating heat flow to a controlled environment, a control chamber formed within said regulator body and being connected directly to said inlet, a resilient diaphragm forming a wall of said control chamber and having a port conducting from said control chamber to the atmosphere, a valve member having a first valve head cooperable with said inlet for controlling the vacuum reaching said control chamber and a second valve head cooperable with said port for controlling the flow of air between said control chamber and the atmosphere, said valve member being connected to be operated by said actuating arm of said bi-metal strip.

23. A temperature responsive actuator comprising a continuous bi-metal strip having the junction line of its two metals lying generally in a plane and having a plurality of bights and a plurality of substantially parallel segments, a supporting frame having a pair of spaced arms, one of said arms being substantially rigidly secured to one alternate set of bights of said bi-metal strip, the other of said arms being substantially rigidly secured to the other set of bights of said bi-metal strip, an actuator housing including a base having side walls attached thereto, said side walls providing the principal support to said spaced arms and being comprised of a highly flexible material for allowing freedom of movement of said bi-metal strip due to temperature changes therein, an actuating arm secured to said bi-metal strip at a plurality of points located intermediate said pair of supporting arms, said actuating arm being movable by said bi-metal strip upon a temperature change of said bi-metal strip, a vacuum regulator, said vacuum regulator including a regulator body having an inlet connected to a vacuum source and an outlet connected to a vacuum responsive mechanism for regulating heat flow to a controlled environment, a control chamber formed within said regulator body and being connected directly to said inlet, a resilient diaphragm forming a wall of said control chamber and having a port conducting from said control chamber to the atmosphere, a valve member having a first valve head cooperable with said inlet for controlling the vacuum reaching said control chamber and a second valve head cooperable with said port for controlling the flow of air between said control chamber and the atmosphere, said actuating arm of said bi-metal strip being connected to said valve member for opening said inlet and substantially simultaneously closing said port, whereby said vacuum source is provided with a pressure sealed connection to said vacuum responsive mechanism.

References Cited by the Examiner

UNITED STATES PATENTS

| | | | |
|---|---|---|---|
| 2,193,588 | 3/1940 | Galloway | 73—363.1 |
| 2,498,259 | 2/1950 | Elmer | 60—23 |
| 2,868,459 | 1/1959 | Modes | 236—87 |
| 3,048,985 | 8/1962 | Long | 236—68 X |

ALDEN D. STEWART, *Primary Examiner.*